UNITED STATES PATENT OFFICE.

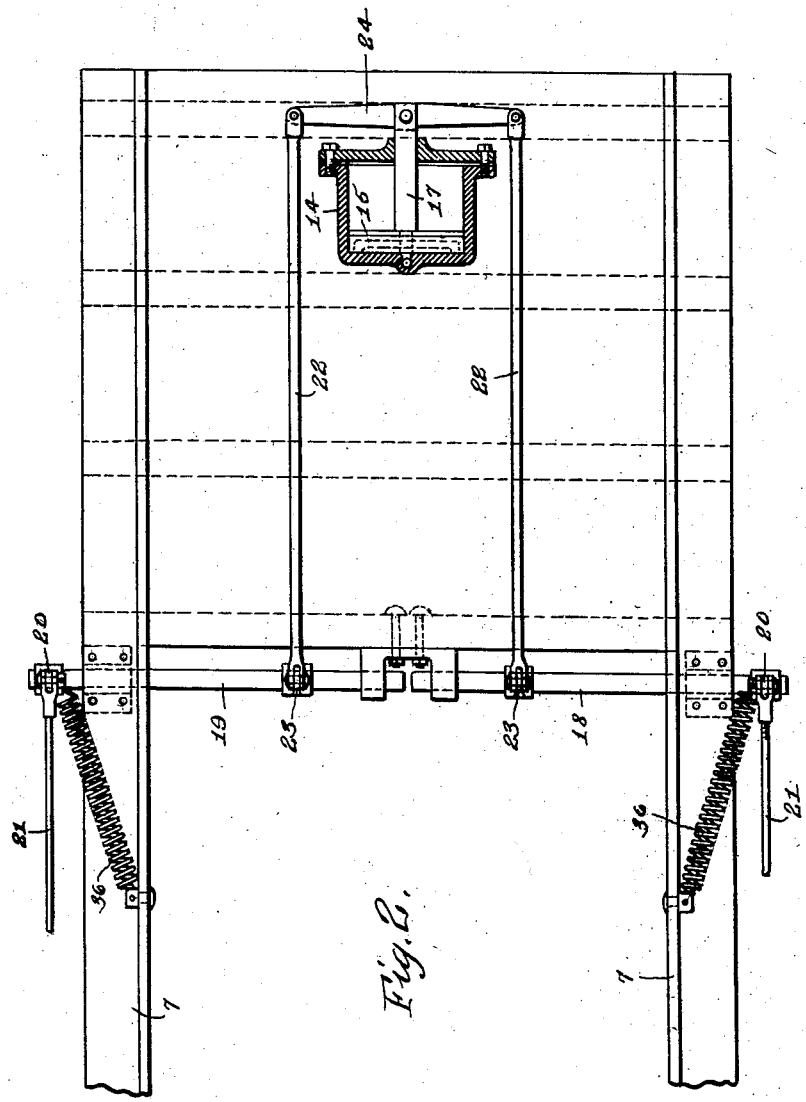

CLYDE C. KEESLER, OF CANASTOTA, NEW YORK, ASSIGNOR TO WATSON WAGON COMPANY, OF CANASTOTA, NEW YORK, A CORPORATION OF NEW YORK.

BRAKE FOR TRAILERS.

1,321,377.   Specification of Letters Patent.   Patented Nov. 11, 1919.

Application filed December 22, 1916. Serial No. 138,353.

*To all whom it may concern:*

Be it known that I, CLYDE C. KEESLER, a citizen of the United States, and a resident of Canastota, in the county of Madison and State of New York, have invented a certain new and useful Brake for Trailers, of which the following is a specification.

This invention has for its object a wagon brake construction by which air brakes operated from the tractor can be applied to the rear wheels of trailers drawn by the tractor; and the invention consists in the combinations and constructions hereinafter set forth and claimed.

In describing this invention, reference is had to the accompanying drawings in which like characters designate corresponding parts in all the views.

Fig. 2 is a plan view of the front end of the frame of a trailer, the air cylinder of the air brake mechanism being shown in section.

Figure 1:
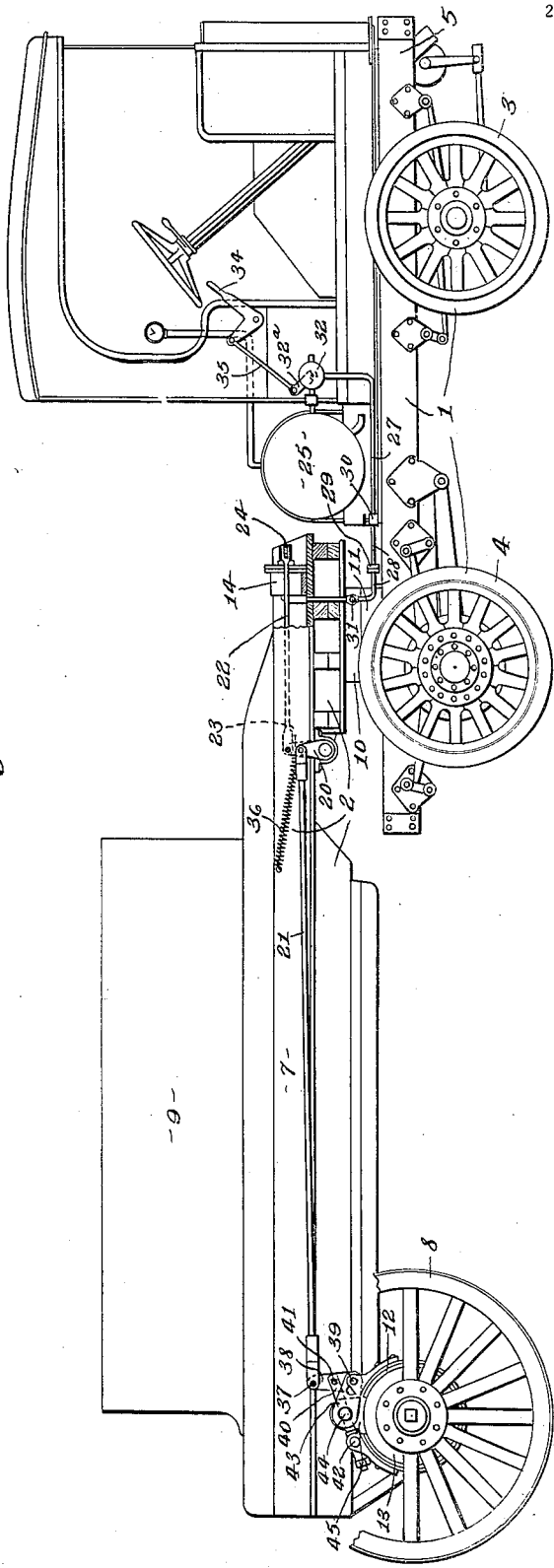
Figure 1 is a side elevation, partly broken away, of a tractor and trailer embodying my invention.

This invention comprises generally, a tractor, a trailer having rear ground wheels, and its front end supported by the rear end of the tractor usually over the driving wheels thereof, the trailer being connected by a swivel or fifth wheel connection, and brakes acting on the rear wheels of the trailer and operable from the tractor.

1 designates the tractor; and 2, the trailer, the tractor having front steering wheels 3, and rear driving wheels 4 which are driven by a suitable motor carried by the frame 5 of the tractor, and the trailer comprising a frame 7 which is supported at its rear end by ground wheels 8, and at its front end on the rear end of the tractor. Said trailer has a hopper 9 supported by the frame. The frame extends in front and in the rear of the hopper, and has at its front end a fifth wheel section 10 which interfits with the complemental fifth wheel 11 on the rear end of the tractor, so that the driving wheels of the tractor occupy the position of the front wheels of a wagon, the fifth wheel sections having a suitable kingbolt connection, not shown. The construction of the fifth wheel connection forms no part of this invention.

Heretofore, the brakes have been applied to the tractor wheels 4 but brakes so applied when a trailer is being drawn are not entirely effective or satisfactory, and the particular object of this invention is to apply the brakes to the rear wheels of the trailer, which brakes are operable by the driver thereof. The brake mechanism in this embodiment of my invention, is operable by compressed air and comprises brake members as bands 12 acting upon drums 13 on the rear wheels 8 of the trailer, an air cylinder having means movable therein and operable by the air pressure, and mechanical connections between said means and the brake bands 12.

In this form of my invention, the air cylinder and mechanism operated thereby, is carried on the front end of the frame 7 of the trailer near the axis of the swivel or fifth wheel connection, and the motion of the movable means operable by the air pressure, is transmitted to the brake bands, mechanically through branch power-transmitting connections, and equalizing means by which the air pressure is transmitted equally to said branches.

14 designates the cylinder which is located on the flooring at the front end of the frame, the air cylinder being located near the axis of the swivel or fifth wheel connection. The movable means in the cylinder 14, operated by the air pressure therein, is in this embodiment of my invention, a single piston 15 having a rod 17 extending through the head of the cylinder 14.

The power transmitting connections between the piston and the brake shoes comprises rock shafts 18, 19 journaled in the frame 7 and having rock arms 20 at their outer ends, links 21 connecting the rock arms and the brake shoes 12 to clamp the same onto the brake drums 13, links 22 connected at like ends to rock arms 23 on the shafts 18, 19 and at their other ends to opposite ends of an equalizing lever 24 which is pivoted between its ends to the piston rod 17. Generally, the links 22 are located on opposite sides of the central longitudinal line of the trailer frame.

25 is a compressed air tank mounted on the tractor and connected to a suitable supply as an air pump and also connected by means of a pipe 27 and flexible tube 28 to the cylinder 14. This air tube 28 is in two sections, one of which is attached to the cylinder and the other of which is attached to the pipe 27, the two sections of the flexible pipe being connected by a suitable detachable coupling 29 of any well known construction.

Suitable valves 30 and 31 are located at the end of the pipe 27 and near the cylinder 14 which valves are closed when the trailer is detached from the tractor. The flow of the air to the air cylinder 14 is controlled by a suitable valve 32 similar to the well known engineer's valve, and the movable part 32ª of this valve is operated by a hand lever 34, located within reach of the seat of the driver and connected by a link 35 to the movable part 32 of the valve. The valve forms no part of this invention, and any suitable control valve may be used.

The air pipe 28 is connected to the cylinder near the axis of the fifth wheel, and as here shown, it passes just outside of the fifth wheel in order that it may be subject to a minimum extent to the relative turning movement of the tractor and the trailer.

The brake bands are applied or tightened by air pressure and are expanded or loosened by means of springs 36 connected at like ends to the frame 7 of the trailer and at their other ends to the rock arms 20 on the rock shafts 18, 19.

The construction of the brake bands form no part of this invention, and the motion of the links 21 may be transmitted thereto in any suitable manner. As here shown, each link 21 is connected at its rear end at 37 to one end of a lever 38, the other arm of which is pivoted at 39 to one end of the brake band, the lever 38 being connected between its ends by a link 40 pivoted thereto at 41 and also pivoted at 42 to the other end of the brake band. The end of the brake band to which the lever 38 is pivoted is held from movement by a link 43 connected at 44 to a stationary part 45.

In operation, by operating the valve 32, air pressure to any degree can be created in the cylinder 14 so that the piston is operated to apply the brakes against the action of the springs 36, and when it is desired to partly release the brakes, the handle 34 of the valve can be operated to permit the air to exhaust from the cylinder as in any well known air brake construction.

What I claim is:

1. The combination of a tractor having rear drive wheels, a trailer having rear ground wheels and having its front end supported by the rear end of the tractor, the trailer and the tractor being connected by a swivel connection, air brake mechanism including a cylinder supported by the trailer, near the axis of said swivel connection, brake members on the rear wheels of the trailer, means movable in the cylinder, and connections for transmitting the motion of said means to the brake members, an air plant on the tractor, and a conduit connecting said plant and the cylinder, substantially as and for the purpose specified.

2. The combination of a tractor, a trailer having rear wheels, and its front end supported on the rear end of the tractor, a swivel connection between the front end of the trailer and the rear end of the tractor, brake mechanism including members acting on the rear wheels of the trailer, a cylinder located on the front end of the trailer near the axis of said swivel connection, means for mechanically transmitting the motion of the expanding air within said cylinder to the brake members, an air compression tank on the tractor, a flexible pipe connecting said plant and the cylinder, and means for controlling the flow through said pipe, substantially as and for the purpose set forth.

3. A dump wagon having ground wheels supporting the rear end thereof, a frame, a hopper supported by the frame, fifth wheel mechanism carried by the frame in front of the hopper, brake mechanism including brake members acting on the rear wheels of the wagon, rock shafts arranged in axial alinement transversely of the frame in front of the hopper, connections between the outer ends of the rock shafts and the brake members, an air cylinder supported by the frame in front of the hopper, near the axis of said fifth wheel mechanism, and having movable means therein arranged to be operated by the air pressure, and connections between said movable means and the rock shafts, substantially as and for the purpose set forth.

4. A dump wagon comprising a frame, a hopper supported by the frame, ground wheels in the rear of the hopper, brake mechanism comprising brake members acting on the ground wheels respectively, rock shafts extending transversely of the frame at one end of the hopper, connections between the outer ends of the rock shafts and the brake members and an air cylinder supported by the frame and having movable means therein arranged to be operated by the air pressure in the cylinder, and mechanical connections between the said means and the rock shafts respectively, substantially as and for the purpose described.

In testimony whereof, I have hereunto signed my name, at Syracuse, in the county of Onondaga, and State of New York, this 14th day of November, 1916.

CLYDE C. KEESLER.